United States Patent
Nelke et al.

(10) Patent No.: US 8,949,166 B2
(45) Date of Patent: Feb. 3, 2015

(54) CREATING AND PROCESSING A DATA RULE FOR DATA QUALITY

(75) Inventors: Sebastian Nelke, Schoenaich (DE);
Martin Oberhofer, Bondorf (DE);
Yannick Saillet, Stuttgart (DE); Jens Seifert, Gaertringen (DE)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 13/217,389

(22) Filed: Aug. 25, 2011

(65) Prior Publication Data
US 2012/0158625 A1 Jun. 21, 2012

(30) Foreign Application Priority Data
Dec. 16, 2010 (EP) .................................... 10195319

(51) Int. Cl.
*G06F 17/00* (2006.01)
*G06F 7/00* (2006.01)
*G06N 5/02* (2006.01)
*G06F 17/30* (2006.01)

(52) U.S. Cl.
CPC .......... *G06N 5/025* (2013.01); *G06F 17/30286* (2013.01); *G06F 17/30569* (2013.01)
USPC ............................................. 706/47; 707/609

(58) Field of Classification Search
CPC ............................................. G06F 17/30569
See application file for complete search history.

(56) References Cited

U.S. PATENT DOCUMENTS

| | | |
|---|---|---|
| 5,315,709 A | 5/1994 | Alston et al. |
| 5,392,390 A | 2/1995 | Crozier |
| 5,555,346 A | 9/1996 | Gross |
| 5,561,793 A | 10/1996 | Bennett et al. |
| 5,586,025 A | 12/1996 | Tsuji |
| 5,684,990 A | 11/1997 | Boothby |
| 5,729,665 A | 3/1998 | Gauthier |
| 5,761,671 A | 6/1998 | Blackman et al. |
| 5,802,253 A | 9/1998 | Gross |
| 5,943,676 A | 8/1999 | Boothby |
| 5,966,717 A | 10/1999 | Sass |
| 6,029,160 A | 2/2000 | Cabrera et al. |
| 6,044,381 A | 3/2000 | Boothby et al. |
| 6,076,090 A | 6/2000 | Burroughs et al. |

(Continued)

FOREIGN PATENT DOCUMENTS

| | | |
|---|---|---|
| EP | 0513653 A2 | 11/1992 |
| EP | 1798684 A1 | 6/2007 |

(Continued)

OTHER PUBLICATIONS

U.S. Appl. No. 13/173,383, filed Jun. 30, 2011, "Handling Data Sets", pp. 1-46.

(Continued)

*Primary Examiner* — Alan Chen
(74) *Attorney, Agent, or Firm* — Susan Murray; Edell, Shapiro & Finnan, LLC

(57) ABSTRACT

A data rule is created and processed by receiving an expression defining a logic of a rule and at least one logical variable, creating a rule definition including the expression and the at least one logical variable for binding each logical variable of the rule with at least one column, associating a characteristic enabling comparison of columns with a first logical variable of the rule definition, and storing the characteristic as part of the rule definition.

18 Claims, 3 Drawing Sheets

(56) References Cited

U.S. PATENT DOCUMENTS

| | | | |
|---|---|---|---|
| 6,154,748 A | 11/2000 | Gupta et al. | |
| 6,230,157 B1 | 5/2001 | Malcolm et al. | |
| 6,279,008 B1 | 8/2001 | Ng et al. | |
| 6,301,584 B1 | 10/2001 | Ranger | |
| 6,408,302 B1 | 6/2002 | Lee et al. | |
| 6,460,048 B1 | 10/2002 | Teng et al. | |
| 6,496,835 B2 | 12/2002 | Liu et al. | |
| 6,609,133 B2 | 8/2003 | Ng et al. | |
| 7,039,898 B2 | 5/2006 | Shah | |
| 7,043,492 B1 | 5/2006 | Neal | |
| 7,069,269 B2 | 6/2006 | Morris | |
| 7,080,088 B1 | 7/2006 | Lau | |
| 7,136,852 B1 | 11/2006 | Sterling et al. | |
| 7,437,471 B2 | 10/2008 | Hohmann | |
| 7,472,346 B2 | 12/2008 | Baelen | |
| 7,536,409 B2 | 5/2009 | Barcia | |
| 7,657,506 B2 | 2/2010 | Levin | |
| 7,797,289 B2 | 9/2010 | Chan et al. | |
| 7,814,045 B2 | 10/2010 | Hermann et al. | |
| 7,921,110 B1 | 4/2011 | Ting et al. | |
| 7,958,162 B2 | 6/2011 | Basile et al. | |
| 8,266,168 B2 | 9/2012 | Bayliss | |
| 8,478,705 B2 | 7/2013 | Meeks et al. | |
| 8,666,998 B2 | 3/2014 | Nelke et al. | |
| 2001/0014890 A1 | 8/2001 | Liu et al. | |
| 2002/0007482 A1 | 1/2002 | Cime | |
| 2002/0089681 A1 | 7/2002 | Gauthier | |
| 2002/0143761 A1 | 10/2002 | Shimano | |
| 2002/0143818 A1 | 10/2002 | Roberts | |
| 2003/0225742 A1 | 12/2003 | Tenner et al. | |
| 2004/0083199 A1* | 4/2004 | Govindugari et al. | 707/1 |
| 2005/0050068 A1 | 3/2005 | Vaschillo et al. | |
| 2005/0091640 A1 | 4/2005 | McCollum | |
| 2005/0131771 A1 | 6/2005 | Tischer | |
| 2005/0182777 A1 | 8/2005 | Block et al. | |
| 2005/0197931 A1 | 9/2005 | Gupta | |
| 2005/0262113 A1 | 11/2005 | Arora et al. | |
| 2005/0283486 A1 | 12/2005 | Lauterbach et al. | |
| 2006/0026127 A1 | 2/2006 | Bodlaender | |
| 2006/0101423 A1 | 5/2006 | Aharoni et al. | |
| 2006/0230025 A1 | 10/2006 | Baelen | |
| 2006/0242181 A1 | 10/2006 | Mueller-Klingspor | |
| 2007/0083607 A1 | 4/2007 | Thompson et al. | |
| 2007/0112827 A1 | 5/2007 | Dettinger | |
| 2007/0198910 A1 | 8/2007 | Jensen | |
| 2007/0239707 A1 | 10/2007 | Collins et al. | |
| 2008/0140602 A1 | 6/2008 | Roth et al. | |
| 2008/0177731 A1 | 7/2008 | Matsuzaki | |
| 2008/0201172 A1 | 8/2008 | McNamar | |
| 2008/0208855 A1 | 8/2008 | Lingenfelder | |
| 2008/0275829 A1 | 11/2008 | Stull et al. | |
| 2008/0319983 A1 | 12/2008 | Meadows et al. | |
| 2009/0006282 A1 | 1/2009 | Roth et al. | |
| 2009/0006283 A1 | 1/2009 | Labrie et al. | |
| 2009/0006472 A1 | 1/2009 | Bush et al. | |
| 2009/0019358 A1 | 1/2009 | Blake | |
| 2009/0024551 A1 | 1/2009 | Agrawal et al. | |
| 2009/0030754 A1 | 1/2009 | McNamar | |
| 2009/0037488 A1* | 2/2009 | Abrams | 707/201 |
| 2009/0138789 A1 | 5/2009 | Tangen et al. | |
| 2009/0287923 A1 | 11/2009 | Topalov et al. | |
| 2010/0131526 A1 | 5/2010 | Sun et al. | |
| 2011/0178971 A1 | 7/2011 | Meeks et al. | |
| 2011/0196621 A1 | 8/2011 | Huyse et al. | |
| 2011/0225173 A1 | 9/2011 | Gulhane et al. | |
| 2012/0066214 A1 | 3/2012 | Nelke et al. | |
| 2012/0095970 A1 | 4/2012 | Shyam et al. | |
| 2012/0096434 A1 | 4/2012 | Rama | |
| 2012/0158625 A1 | 6/2012 | Nelke et al. | |
| 2012/0158678 A1* | 6/2012 | McGraw et al. | 707/694 |
| 2012/0197836 A1 | 8/2012 | Meeks et al. | |
| 2012/0216274 A1 | 8/2012 | Chauhan et al. | |
| 2012/0254739 A1 | 10/2012 | Dehmann et al. | |
| 2012/0330911 A1* | 12/2012 | Gruenheid et al. | 707/694 |
| 2013/0031117 A1 | 1/2013 | Mandelstein et al. | |

FOREIGN PATENT DOCUMENTS

| | | |
|---|---|---|
| JP | 2007279852 A | 10/2007 |
| WO | 0062191 | 10/2000 |

OTHER PUBLICATIONS

International Search Report and Written Opinion, PCT/EP2011/062074, Sep. 21, 2012, 16 pages.

Mason B. McDaniel, "An Algorithm for Content-Based Automated File Type Recognition, Master Thesis", James Madison University, www.forensicswiki.org/w/images/f/f9/Mcdaniel01.pdf Dec. 1, 2001, 105 pages.

International Search Report and Written Opinion, PCT/IB2012/053380, Nov. 15, 2012, 10 pages.

"Legacy Data Encapsulator", ip.com, Jun. 14, 2001, 3 pages.

PCT International Search Report and Written Opinion, PCT/EP2011/069332, Jan. 5, 2012, 12 pages.

Wolfgang May, "A Database-Based Service for Handling Logical Variable Bindings", Institut fur Informatik, Universitat Gottingen, Germany, 14 pages, Jan. 1, 2009.

Computer Associates International et al., CleverPath Avion Business Rules Expert, Computer Associates International, Inc., 64 pages, Jan. 1, 2004.

Computer Associates International et al., Chapter 5 "Pattern Matching, Pattern Matching Rules", Computer Associates International, Inc., 36 pages, Jan. 1, 2004.

Computer Associates International et al., Chapter 7 "Truth Maintenance, Truth Maintenance Operations and Terminology", and Chapter 8 Maintaining the Dynamic Rulebase, Computer Associates International, Inc., 12 pages, Jan. 1, 2004.

http://www.xbrl.org/TaxonomyRecognition/ US%20GAAP%202009/XBRLUS-USGAAP, "XBRL US Country Taxonomy 2009", pp. 1-2.

http://www.xbrl.org/TaxonomyRecognition/ US%20GAAP%202009/XBRLUS-USGAAP, "XBRL US Accountants' Report Taxonomy 2009", pp. 1-2.

http://www.xbrl.org/TaxonomyRecognition/ US%20GAAP%202009/XBRLUS-USGAAP, "XBRL US GAAP Taxonomy 2009", pp. 1-2.

http://www.w3.org/TR/owl-parsing/ "OWL Web Ontology Language Parsing OWL in RDF/XML", W3C Working Group Note Jan. 21, 2004, pp. 1-20.

Pauvel Shvaiko et al., "Ontology Matching OM-2009", Papers from the ISWC Workshop, pp. 1-271.

Koch et al., "Policy Definition Language for Automated Management of Distributed Systems", (1996) IEEE 2nd Int'l of Distrib. Sys., pp. 55-64.

Computer Associates International et al., Chapters 7-9, "Truth Maintenance", Computer Associates International, Inc., 70 pages, Jan. 1, 2004.

Pattern Matching Rules Guide r10, "CleverPath Aion Business Rules Expert", (2004) Computer Associates Int'l Inc. L00072-1E, Ch. 1-4, 61 pp.

Pattern Matching Rules Guide r10, "Pattern Matching", (2004) Computer Associates Int'l Inc. L00072-1E, Ch. 5-6, 35 pp.

Pattern Matching Rules Guide r10, "Truth Maintenance", (2004) Computer Associates Int'l Inc. L00072-1E, Ch. 7-9 & App A-C & Index, 67 pp.

\* cited by examiner

CREATING AND PROCESSING A DATA RULE FOR DATA QUALITY

BACKGROUND

The present invention relates in general to the field of data management, and in particular to a method and a system for creating and processing a data rule. Still more particularly, the present invention relates to a data processing program and a computer program product for creating and processing a data rule.

With the increasing complexity of modern IT infrastructure it becomes more and more important for enterprises to control the quality of their data. Bad data quality, such as data inconsistencies, lack of standardization, data redundancy, duplication of records, miss-use of data fields, etc. can lead to a serious business impact. For this reason the market for tools specialized in data quality assessment and monitoring keeps expanding.

Tools usually allow users to profile their data by analyzing the value distributions for each column, analyzing the values, the typical formats and to specify the valid range or set of values and formats. Additionally some of these tools can also provide functions to analyze the functional dependencies between multiple columns.

From the result of these analyses the user can identify typical data quality problems, such as uniqueness constraints not being respected, or columns containing unexpected values or non-standardized values. Once these problems are discovered, the user can write data quality rules whose role is to monitor a potential data quality problem.

For example, a rule may be defined to check the cardinality of a column, if the data analysis shows that this column which is expected to contain unique values has some duplicate values. If some duplicate values are added to the column, the rule will indicate which records violate the uniqueness constraint of the column A further rule may be defined to verify that the values in the column always match a regular expression representing the possible formats of a phone number, if the data analysis shows that a column which is supposed to contain phone numbers also contains some other values which are not phone numbers, for instance Email addresses.

Once the initial data analysis has been done to understand the semantic of the data, and existing data quality problems have been shown, the data quality of the data is monitored over the time by defining a collection of rules verifying all the constraints which should be verified by correct data. By doing this, new data quality problems appearing over the time with the addition of new data or with the modification of existing data can be recognized early enough to be corrected.

On complex IT systems the manual definition of such rules is difficult and time consuming because of the high number of tables and columns and the lack of metadata/documentation. Models may contain about 70,000 tables, most tables having 50-100 columns, and it is not clear in such systems what the semantic of each table is. The name of the tables and columns are quite often cryptic and give no indication about the real semantic of the data they contain.

Quite often the same type of rule can be applied to different columns from different data sources. For instance a system may store phone numbers in many different tables for the different modules and a rule checking for the validity of the phone number it contains should be ideally defined for all these different columns containing phone numbers.

SUMMARY

Present invention embodiments provide a method of creating and processing a data rule and a system for creating and processing a data rule, which are able to suggest automatically data rules to apply on data source columns.

Accordingly, in an embodiment of the present invention, a method of creating and processing a data rule using an electronic computing device comprises the computing device receiving an expression defining a logic of a rule and at least one logical variable; creating a rule definition including the expression and the at least one logical variable for binding each logical variable of the rule with at least one column; associating a characteristic enabling comparison of columns with a first logical variable of the rule definition; and storing the characteristic as part of the rule definition.

In another embodiment of the present invention, a system for creating and processing a data rule comprises a user interface for managing I/O functions of the system, including a rule editor configured for creating a plurality of rule definitions including an expression defining a logic of a rule and at least one logical variable for binding each logic variable of the rule with at least one column; a rule repository for storing the plurality of rule definitions; a data processing engine in electronic communication with the user interface and the rule repository for associating a characteristic enabling comparison of columns with a first logical variable of the rule definition, and for storing the characteristic as part of the rule definition in the rule repository.

In yet another embodiment of the present invention, a computer program product stored on a computer-usable medium, comprises computer-readable program means for causing a computer to perform a method of creating and processing a data rule when the program is run on the computer.

Embodiments of the present invention provide an automatic way to use the right data rules for the right columns.

DETAILED DESCRIPTION

Present invention embodiments find automatically all combinations of rules and columns which should be used to have a maximum coverage of the data by the data rules, when a list of existing reusable rules such as rules validating email addresses, rules validating phone numbers, rules validating addresses, etc. is given that may have been discovered automatically by previous prior art systems or methods, or developed by domain experts.

Present invention embodiments apply not only to data quality rules but also to other types of rules, such as data masking, data standardization and/or data transformation. For example, a data masking rule is a rule which scrambles the values of some columns containing sensitive information like person names, credit card numbers. For example, a data standardization rule is a rule which standardizes some values that can have several valid representations into a unified representation, e.g. standardization of addresses, or product codes. For example, the data transformation rule is a rule transforming a value into something different.

Embodiments of the present invention automatically "annotate" the rule with domain signatures which give a hint about which domains a rule can be applied. Embodiments of the present invention associate each variable of each existing data rule and each column of each data source with a domain signature computed from the data, which characterizes the data domains. The main characteristic of these signatures, which are based on several metrics, is that they can be pre-computed and persisted and are easy to compare with each other. An initial mapping can be done to find out which columns have values belonging to a domain that could be compatible with each rule. Promising candidates can then be validated by testing the rule on a sample of the data and taking the number of violations as a final indicator of the compatibility of the rule with the source or not.

Figure 1:
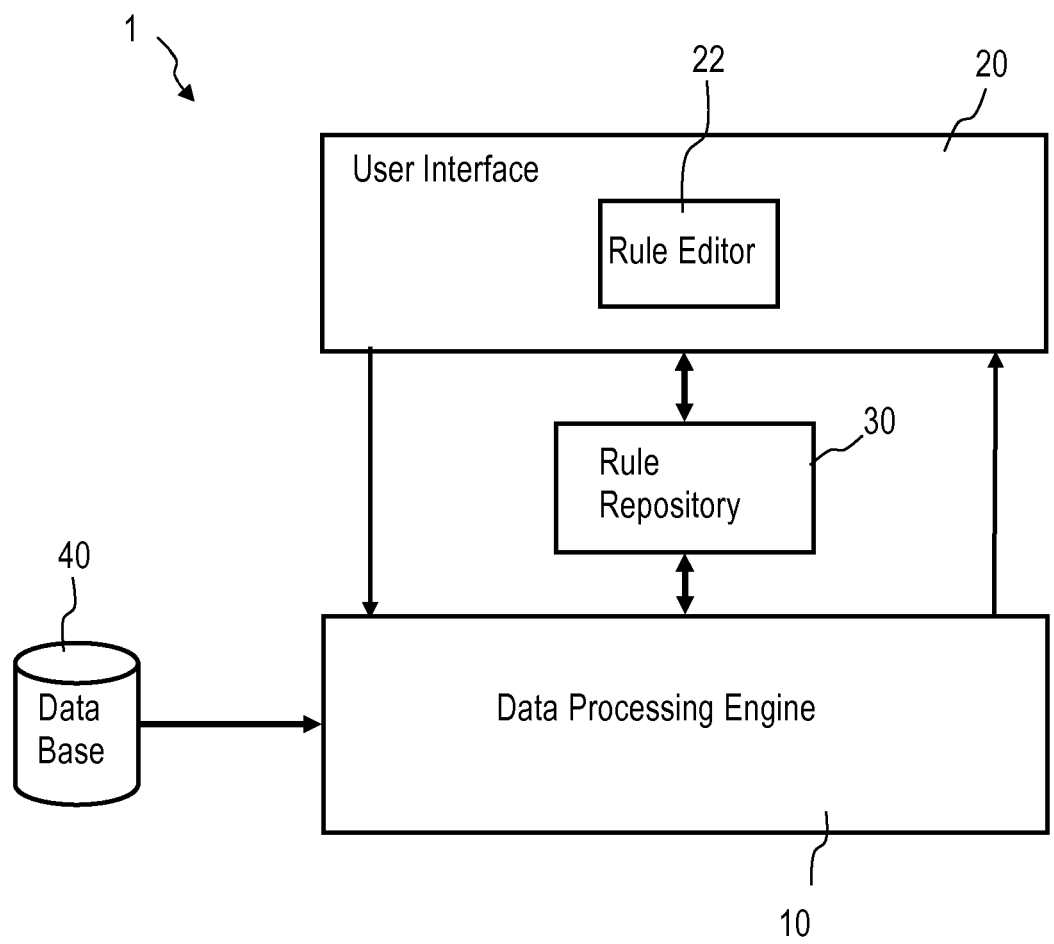
FIG. 1 is a schematic block diagram of a system for creating and processing a data rule, in accordance with an embodiment of the present invention.
Figure 2:
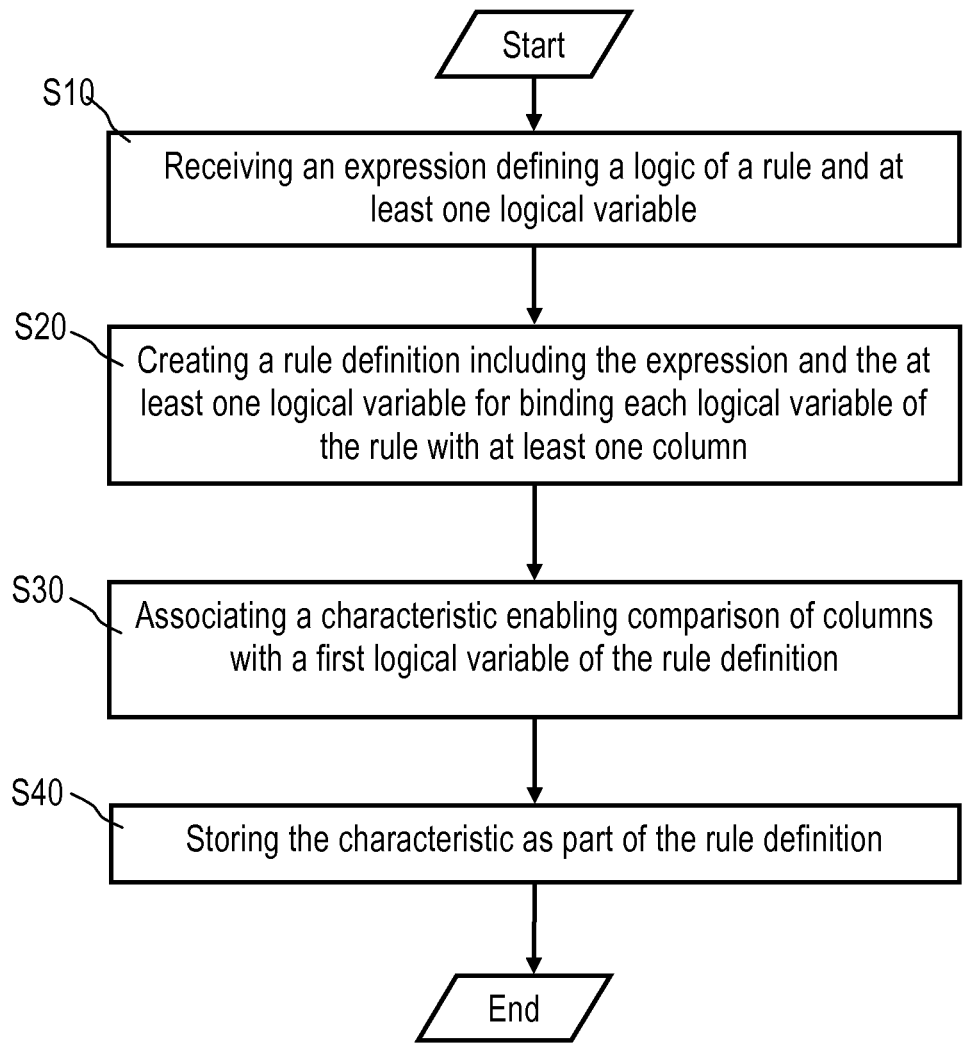
FIG. 2 is a schematic flow diagram of a method of creating and processing a data rule, in accordance with an embodiment of the present invention.

FIG. 1 shows a data processing system 1 for creating and processing a data rule, in accordance with an embodiment of the present invention; FIG. 2 shows a method of creating and processing a data rule, in accordance with an embodiment of the present invention; and FIG. 3 shows a rule definition 200 in accordance with an embodiment of the present invention.

Figure 3:
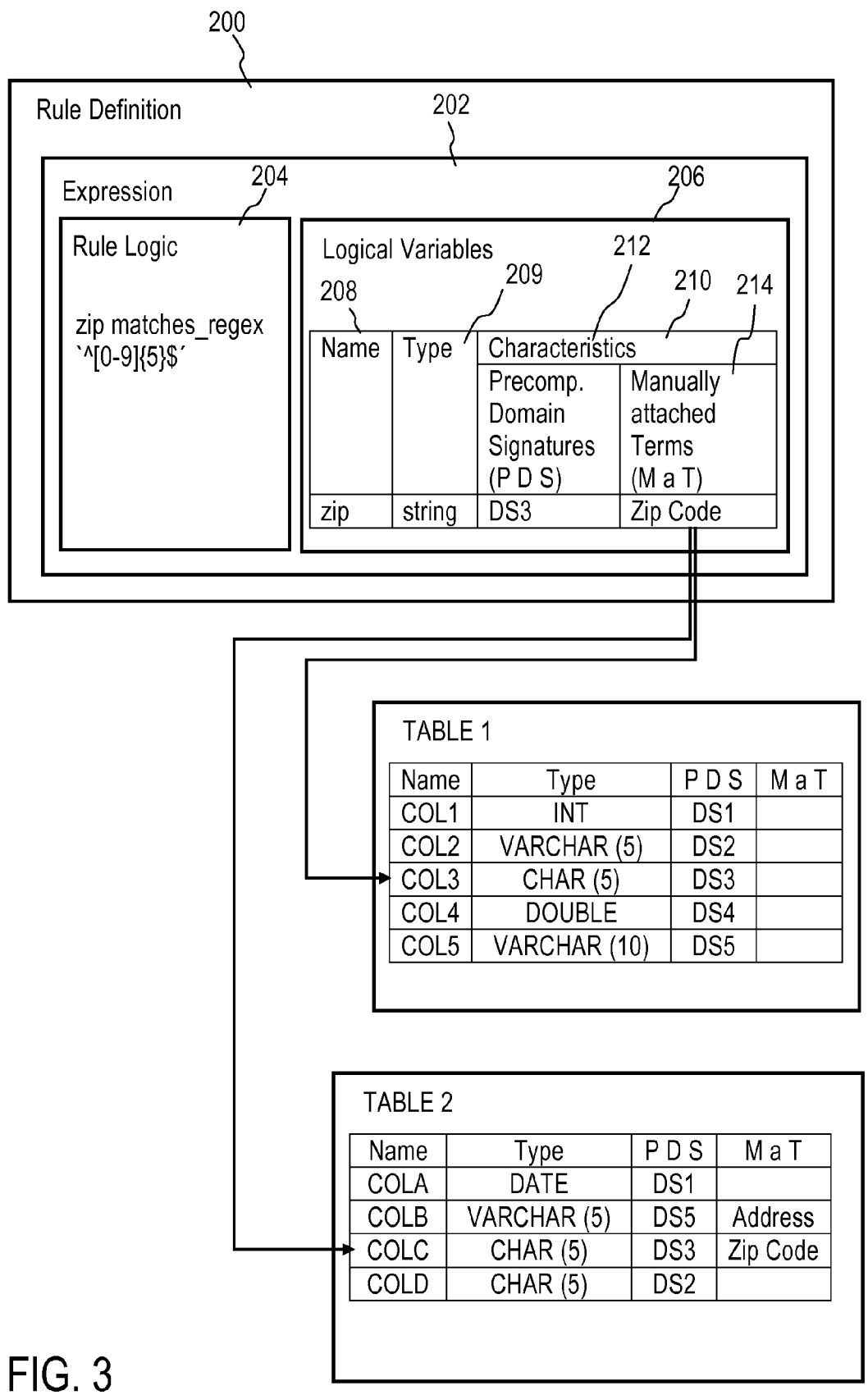
FIG. 3 is an illustrative representation of a logical structure for rule definition in accordance with embodiments of the present invention.

Referring to FIGS. 1 and 3, the illustrated embodiment of the present invention employs a data processing system 1 for creating and processing a data rule. In this embodiment the data processing system 1 comprises a user interface 20 for managing I/O functions of the system 1, including a rule editor 22 configured for creating a plurality of rule definitions 200, including an expression 202 defining a logic of a rule 204 and at least one logical variable 206 for binding each logical variable 206 of the rule with at least one column COL1 to COL5, COLA to COLD; a rule repository 30 for storing the plurality of rule definitions 200; and a data processing engine 10 in electronic communication with the user interface 20 and the rule repository 30 for associating a characteristic enabling comparison of columns COL1 to COL5, COLA to COLD with a first logical variable 206 of the rule definition 200, and for storing the characteristic 210 as part of the rule definition 200 in the rule repository 30. As illustrated in FIG. 1 the data processing engine 10 may be further in communication with database 40, which may be configured for storing data upon which the data rules are used.

The data processing engine 10 may receive information about the binding between a logical variable 206 and a column, here COLC, from the user interface 20, and the data processing engine then reads the characteristics DS3 and "Zip Code" from metadata associated with the column COLC. In this case the user makes the binding and the characteristics DS3 and "Zip Code" of the column COLC are then stored as part of the rule definition 200. Alternatively the data processing engine 10 may receive all components 212 and 214 of the characteristic 210 enabling the comparison of columns COL1 to COL5, COLA to COLD from the user interface 20. In this case the user explicitly provides all components 212 and 214 of the characteristic 210.

The data processing engine 10 validates received information about a binding between a logical variable 206 and a further column, here COL3, from the user interface 20 based on comparing the characteristics PDS and MaT of column COL3 with the stored characteristic 210. In this case the user validates a binding based on the signatures DS3 and "Zip Code" already stored in the rule definition 200 and the signature DS3 of the column COL3 now bound to the rule.

To automatically suggest rule candidates based on characteristics 210, the data processing engine 10 checks whether a further column from among COL1 to COL5 and COLA to COLD can be found that has a characteristic PDS and MaT similar to the characteristic 210 of the rule definition 200. A combination of the further column COL1 to COL5, COLA to COLD and the logical variable 206 of the rule definition 200 is handled as a rule candidate and tested on a data sample. The rule candidate is removed from a list of rule candidates if the number of records that fail to conform to the rule exceeds a predefined threshold in the validation step. The list of rule candidates is presented to the user for review using the user interface 20 after the rule candidates have been tested.

For selectively applying a data rule based on similarity between records and the characteristics 210, the data processing engine 10 generates a data rule based on the rule definition 200, and it selectively applies the data rule to records in tables TABLE 1 and TABLE 2, containing columns COL1 to COL5 and COLA to COLD respectively, depending on whether values in the column COL1 to COL5, COLA to COLD match the characteristic 210.

The shown embodiment of the present invention shown in FIG. 2 employs a method of creating and processing a data rule using an electronic computing device. In step S10 computing device 10 receives an expression 202 defining a logic of a rule 204 and at least one logical variable 206. In step S20 the computing device 10 creates a rule definition 200 including the expression 202 and the logical variable(s) 206 for binding each logical variable 206 of the rule with at least one column COL1 to COL5, COLA to COLD. In step S30 the computing device 10 associates a characteristic 210 enabling comparison of columns COL1 to COL5, COLA to COLD with a logical variable 206 of the rule definition 200. In step S40 the computing device 10 stores the characteristic 210 as part of the rule definition 200. To associate a characteristic 212 with a logical variable 206, the computing device receives information about the binding between the logical variable 206 and a column COL1 to COL5, COLA to COLD. In this case the characteristic 210 is read from meta-data associated with the first column COL1 to COL5, COLA to COLD. Alternatively the associating step may be done by the user by providing the characteristic 210 enabling the comparison of columns COL1 to COL5, COLA to COLD using the user interface 20, for example.

FIG. 3 is an illustrative representation of a logical structure for rule definition 200 in accordance with embodiments of the present invention. As utilized herein, the rule definition 200 includes the logical definition 202 of a rule without any assumption as to a physical source or particular location where the rule may be applied. For example, typically, a rule might be written in the following manner: "EMPLOYEE.AGE>0". In this example, the rule is tied to a particular location. That is, "EMPLOYEE.AGE" resolves the rule to a column "AGE" for a table named "EMPLOYEE." To eliminate references to a particular location, a rule definition may be written in the following manner: "age>0". In this example, the rule is not tied to a particular location. Rather, "age," in this example, is a logical variable. In some examples, an even more generic rule may be written such as "age>min_age," where both "age" and "min_age" are logical variables.

Returning to FIG. 3, rule definition 200 as contemplated herein includes expression 202 and logical variables 206. As illustrated, expression 202 includes the rule logic 204 having a number of logical variables 206. In embodiments, any number of logical variables 206 may be utilized without departing from the present invention. In this example, the following expression illustrating a generic rule verifying the format of a ZIP code is written as "zip matches_regex '^[0-9]{5}$'" indicating that a zip code is a value made up of 5 digits. Thus, from expression 202, rule definition 200 includes one logical variable 206 identified and listed as zip. When a user creates or modifies a rule definition, the user may utilize a rule editor 22 to modify an expression 202. The rule editor 22 used to edit the expression 202 of a rule definition 200 can be a simple text editor to edit the rule as a plain text expression, or a more complex editor allowing the user to drag and drop physical columns COL1 to COL5, COLA to COLD on the expressions 202 without departing from embodiments provided herein. When a user incorporates physical columns COL1 to COL5, COLA to COLD to build a rule, those physical columns COL1 to COL5, COLA to COLD may be automatically transformed from the expression 202 into pure logical variables 206, while the reference to the column COL1 to COL5, COLA to COLD itself can be automatically stored in the preferred binding of the variable 206 to facilitate the creation of an executable rule later. Once an expression 202 is saved, the system 10 parses the expression 202 and extracts a list of the logical variables 206 contained in it.

Identified logical variables 206 may be listed and include name 208, expected type 209, and optionally, default binding target, not shown. Name 206 may be generally identified from expression 202. Expected type 209 may be utilized to indicate the type of variable 209, e.g. string, numeric, date, time, timestamp, etc., expected for a corresponding logical variable 206. An expected type 209 of each logical variable 206 may be guessed by the system 10 from the context of the expression 202. For instance, "age>0" implies that age must be numeric, since it is compared to a numerical value. However, in some embodiments, the type of variable 209 may not have a standard expected type. In those embodiments, an expected type 209 may be "ANY." An "ANY" designation indicates that the field is effectively typeless or untyped. Thus, typed and untyped fields may be supported in embodiments provided herein. Each variable 206 has an expected type 209 and must be bound to a source of compatible data type before the rule can be used. Default binding target may be utilized to identify a previously designated default location where a logical variable may be bound. In embodiments, default binding targets may be previously defined by a user or administrator, or may be defined from binding historical data.

In order to be able to detect good candidates where a data rule can be applied, each rule variable 206 is associated with one or several precomputed domain signatures 212 and/or zero or several business terms 214 describing the domain of the logical variable 206. This domain information is added as characteristics 210 to the expected data type as shown in FIG. 3.

The invention implies that the domain signatures DS1 to DS5 have been precomputed and persisted for all columns COL1 to COL5, COLA to COLD which can be a candidate for the application of at least one of the defined data rules 204. Optionally the business users can associate by hand some business terms MaT to some of these columns COL1 to COL5, COLA to COLD during the data profiling of the sources; for example, a term "Address" is associated to Column COLB and a term "Zip Code" is associated to Column COLC. In the IBM product portfolio, IBM® InfoSphere®, Business Glossary would be used to maintain business terms and synonyms and attach them to table, columns or data rules. (IBM and InfoSphere are trademarks of international Business Machines Corporation, registered in many jurisdictions worldwide.)

A domain signature characterizes how the data in a domain (e.g., in a column) usually look. A computational method calculates a domain signature DS1 to DS5 for a column COL1 to COL5, COLA to COLD or a list of values. The domain signature DS1 to DS5 is made up of one or several metrics which are weighted automatically differently depending on the nature of the data.

Examples of metrics that can be used in such a domain signature PDS are: general statistics about the string values for character based columns such as average string lengths, average number of words, percentage of letters, percentage of digits, percentage of special chars, etc.; the top N most recurring words appearing in the values; the top N most used formats of the values; single characters and bigrams of characters distributions; numerical statistics for numerical columns, etc.

The key idea is that these metrics can be precomputed for any column COL1 to COL5, COLA to COLD or any list of values, and persisted as additional meta-data information for the column COL1 to COL5, COLA to COLD. Each metric provides an algorithm which computes its own confidence given the data on which it was computed, and an algorithm which computes its similarity to another metric of same type computed for another column COL1 to COL5, COLA to COLD. A collection of such metrics computed for a column COL1 to COL5, COLA to COLD build up a domain signature PDS, which, by using a weighted average of the metrics composing it, can also compute a similarity factor with the domain signature PDS computed for another column COL1 to COL5, COLA to COLD.

The precomputation of the metrics is computing intensive because all the values of the columns must be analyzed (unless it is computed on a sample), but this operation need be done only once for each column, and the result is persisted. The comparison between two metrics is very fast and doesn't require looking again at the individual values of the columns.

By using this mechanism, the precomputed domain signatures DS1 to DS5 of two different columns COL1 to COL5, COLA to COLD can be easily, and without much computation, compared with each other to measure how similar the data contained in the two columns COL1 to COL5, COLA to COLD look. Here we define similarity not as the data being same data, but as the data seeming to have the same semantic. For instance, two columns COL3, COLC containing zip codes would have two domain signatures DS3 returning a high similarity score when compared with each others, because the metrics computed from their values, such as percentage of digits and special chars, average length, etc., are close to each other even if the values are different. On the other side the domain signatures DS3 and DS5 of a column COLC containing zip codes and a column COLB containing addresses will return a similarity score close to zero because the values contained in both columns COLC and COLB have fundamentally different characteristics 210.

In analogy with the human brain, the domain signature PDS is a formalized way to simulate how a human would recognize that a column seems to contain post office addresses based on his experience, just by looking at the general appearance of the values (typical length and words found in the values) and without looking at the details of individual values.

When a new data rule is defined, the user has the possibility to specify for each logical variable 206 some business terms 215 describing the domain of the logical variable 206. Additionally he can specify one or several existing columns COL1 to COL5, COLA to COLD for which the rule is applicable. During this operation the domain signatures DS1 to DS5 of the selected columns COL1 to COL5, COLA to COLD are automatically associated to the logical variable 206 of the rule 204.

If this information is not filled during the creation of the rule, each time a rule is used on columns COL1 to COL5, COLA to COLD, the domain signatures DS1 to DS5 and eventual business terms 214 associated with the columns COL1 to COL5, COLA to COLD are automatically added to the logical variables 206 of the rule. That way the rule variables 206 are annotated with business terms 214 and domain signatures 212 of columns COL1 to COL5, COLA to COLD for which the rule is known to be applicable.

With this information associated with the rules, automatic discovery of combinations of rule variables with columns can be done for each rule and for each table TABLE 1, TABLE 2 or group of joined tables as follows:

Find for each rule variable 206 if columns COL1 to COL5, COLA to COLD can be found with either a domain signature DS1 to DS5 whose similarity with one of the domain signatures DS3 associated with the rule variable 206 exceeds a minimum threshold or whose business terms MaT are similar to the business terms 214 associated with the rule variable 206 or with one of its synonyms as defined in the term repository.

If at least one column COL3, COLC can be found for each rule variable 206, add the combination rule/possible binding to the list of the rule candidates. If no column COL1 to COL5, COLA to COLD can be found for one of the rule variables 206, go to the next table TABLE 1, TABLE 2 or group of joined tables.

The result of this operation is a list of possible rule binding candidates (combination of rule and possible binding for all its variables). In the shown embodiment column COLC and column COL3 will be in the list. The candidate can be validated as follow:

For each rule binding candidate, test the rule with the given binding on a data sample. If the number of records that fail to conform to the rule exceeds a predefined threshold, remove the rule binding candidate. Finally present the list of candidates to the user for review and if accepted create the rules.

The method of creating and processing a data rule can be implemented as an entirely software embodiment, or an embodiment containing both hardware and software elements. In a preferred embodiment, the present invention is implemented in software, which might include, but is not limited to, firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented method of creating and processing a data rule using an electronic computing device, the method comprising:
   receiving an expression defining a logic of a rule and at least one logical variable;
   creating a rule definition including the expression and the at least one logical variable for binding each logical variable of the rule with at least one column;
   associating a characteristic enabling comparison of columns with a logical variable of the rule definition; and
   storing the characteristic as part of the rule definition.

2. The method according to claim 1, wherein the associating comprises:
   receiving information about the binding between the logical variable and a column; and
   reading the characteristic from metadata associated with the column.

3. The method according to claim 1, wherein the associating is achieved by a user and comprises providing the characteristic enabling the comparison of columns.

4. The method according to claim 1, further comprising:
   receiving information about a binding between the logical variable and a column; and
   validating the binding based on comparing a characteristic of the column with the stored characteristic.

5. The method according to claim 1, further comprising:
   checking whether a column can be found that has a characteristic similar to the characteristic of the rule definition;
   handling a combination of the column and the rule definition as a rule candidate;
   testing the rule candidate on a data sample;
   removing the rule candidate from a list of rule candidates when the number of failed records exceeds a predefined threshold in the validation step; and
   presenting the list of rule candidates to the user for review after the rule candidates have been tested.

6. The method according to claim 1, further comprising generating a data rule based on the rule definition; and
   selectively applying the data rule to records in a table comprising a column
   depending on whether values in the column match the characteristic.

7. A system for creating and processing a data rule comprising:
   a processor configured to perform the operations of:
     providing a user interface to manage I/O functions of the system, including a rule editor configured to create a plurality of rule definitions including an expression defining a logic of a rule and at least one logical variable for binding each logical variable of the rule with at least one column;
     storing within a rule repository the plurality of rule definitions; and
     providing a data processing engine in electronic communication with the user interface and the rule repository to associate a characteristic enabling comparison of columns with a logical variable of the rule definition, and to store the characteristic as part of the rule definition in the rule repository.

8. The system according to claim 7, wherein the processor is further configured to control the data processing engine to receive information about the binding between the logical variable and a column from the user interface, and the processor is further configured to control the data processing engine to read the characteristic from meta-data associated with the column.

9. The system according to claim 7, wherein the processor is further configured to control the data processing engine to receive the characteristic enabling the comparison of columns from the user interface.

10. The system according to claim 7, wherein the processor is further configured to control the data processing engine to receive information about a binding between the logical variable and a column from the user interface, and the processor is further configured to control the data processing engine to validate the binding based on comparing characteristic of the column with the stored characteristic.

11. The system according to claim 7, wherein the processor is further configured to control the data processing engine to check whether a column can be found that has a characteristic similar to the characteristic of the rule definition, to handle a combination of the column and the rule definition as a rule candidate, to test the rule candidate on a data sample, to remove the rule candidate from a list of rule candidates when the number of failed records exceeds a predefined threshold in the validation step, and to present the list of rule candidates to the user interface for review after the rule candidates have been tested.

12. The system according to claim 7, wherein the processor is further configured to control the data processing engine to generate a data rule based on the rule definition, and to selectively apply the data rule to records in a table comprising a column depending on whether values in the column match the characteristic.

13. A computer program product for creating and processing a data rule comprising:
    a computer readable storage device having computer-readable program code embodied therewith, the computer readable program code configured to perform operations of:
        receiving an expression defining a logic of a rule and at least one logical variable;
        creating a rule definition including the expression and the at least one logical variable for binding each logical variable of the rule with at least one column;
        associating a characteristic enabling comparison of columns with a logical variable of the rule definition; and
        storing the characteristic as part of the rule definition.

14. The computer program product of claim 13, wherein the associating comprises:
    receiving information about the binding between the logical variable and a column; and
    reading the characteristic from metadata associated with the column.

15. The computer program product of claim 13, wherein the associating is performed by providing the characteristic enabling the comparison of columns.

16. The computer program product of claim 13, wherein the operations performed by the computer readable program code further comprise:
    receiving information about a binding between the logical variable and a column; and
    validating the binding based on comparing characteristic of the column with the stored characteristic.

17. The computer program product of claim 13, wherein the operations performed by the computer readable program code further comprise:
    checking whether a column can be found that has a characteristic similar to the characteristic of the rule definition;
    handling a combination of the column and the rule definition as a rule candidate;
    testing the rule candidate on a data sample;
    removing the rule candidate from a list of rule candidates when the number of failed records exceeds a predefined threshold in the validation step; and
    presenting the list of rule candidates to the user for review after the rule candidates have been tested.

18. The computer program product of claim 13, wherein the operations performed by the computer readable program code further comprise:
    generating a data rule based on the rule definition; and
    selectively applying the data rule to records in a table comprising a column depending upon whether values in the column match the characteristic.

* * * * *